(12) United States Patent
Hey et al.

(10) Patent No.: US 12,072,420 B2
(45) Date of Patent: Aug. 27, 2024

(54) METHODS AND APPARATUS FOR GEOSPATIAL DATA GENERATION

(71) Applicant: Quantum Spatial, Inc., Hollywood, FL (US)

(72) Inventors: Mischa Hey, Corvallis, OR (US); Chad Evely, Nicholasville, KY (US)

(73) Assignee: NV5 GEOSPATIAL, INC., Hollywood, FL (US)

( * ) Notice: Subject to any disclaimer, the term of this patent is extended or adjusted under 35 U.S.C. 154(b) by 476 days.

(21) Appl. No.: 17/392,823

(22) Filed: Aug. 3, 2021

(65) Prior Publication Data

US 2022/0043154 A1 Feb. 10, 2022

Related U.S. Application Data

(60) Provisional application No. 63/061,117, filed on Aug. 4, 2020.

(51) Int. Cl.
| | |
|---|---|
| G06K 9/00 | (2022.01) |
| G01S 17/89 | (2020.01) |
| G06F 18/211 | (2023.01) |
| G06T 7/20 | (2017.01) |
| G06T 7/70 | (2017.01) |
| G06V 10/75 | (2022.01) |

(52) U.S. Cl.
CPC ............ *G01S 17/89* (2013.01); *G06F 18/211* (2023.01); *G06T 7/20* (2013.01); *G06T 7/70* (2017.01); *G06V 10/751* (2022.01); *G06T 2207/30241* (2013.01)

(58) Field of Classification Search
None
See application file for complete search history.

(56) References Cited

U.S. PATENT DOCUMENTS

| | | | |
|---|---|---|---|
| 11,482,045 B1 * | 10/2022 | Kim | G06V 20/52 |
| 2020/0150275 A1 * | 5/2020 | Zhu | G06T 7/10 |

* cited by examiner

*Primary Examiner* — Wei Wen Yang
(74) *Attorney, Agent, or Firm* — DUANE MORRIS LLP; Karen C. Kline; Joaquin Hernandez (57) ABSTRACT

A system and method of generating enhanced lidar data for a scene is provided. The system having a lidar point collection system, with a lidar sensor and a lidar point processing system, and an image collection system with an image sensor and an image processing system. The lidar point collection system can obtain lidar data of the scene with the lidar sensor, and the image collection system can obtain a plurality of images of the scene with the image sensor. The system further has a processing system for comparing the collected lidar data and plurality of images to generate enhanced lidar data of the scene.

20 Claims, 5 Drawing Sheets

METHODS AND APPARATUS FOR GEOSPATIAL DATA GENERATION

CROSS-REFERENCE TO RELATED APPLICATION

This application claims the benefit of U.S. Provisional Application No. 63/061,117 entitled METHODS AND APPARATUS FOR GEOSPATIAL DATA GENERATION, filed on Aug. 4, 2020, the content of which is herein incorporated by reference in its entirety.

FIELD OF THE INVENTION

The disclosure relates generally to geospatial data and analytics and, more particularly, to the generation of geospatial data.

BACKGROUND OF THE INVENTION

The full possibilities of derived analytics from remotely sensed data often depend on fusion of data from multiple sensors. Lidar provides significant structural information, but little spectral information relative to imagery sensors. Accurate assignment of spectral information directly to lidar point clouds further enables feature extraction, classification, visualization, and analysis beyond lidar or imagery alone. Traditional methods of spectral assignment from imagery rely on surface generation for rectification, but can result in localized inaccuracies due to feature lean and occlusion. This process is further complicated by the flight plans for lidar and imagery collection differing significantly, resulting in drastically different look angles for imagery and lidar.

Further, traditional colorization of lidar points is accomplished by creating a seamless orthophoto and then referencing the orthophotos' color at each point's horizontal (X/Y) position. This traditional process forces every contiguous area of the scene to be colorized by a single image frame. Inherent to traditional orthophotos is the building lean effect wherein an object's apparent horizontal position is offset from its true horizontal position at a magnitude proportional to its distance from the center of the image frame. For objects towards the edge of a collected frame, this offset is significant, resulting in holes or "occlusions" in the dataset when used to colorize lidar points that lie near a leaning or tilted tree, building, or other relatively tall object.

SUMMARY OF THE INVENTION

In the present disclosure, the ray tracing approach to colorization effectively performs a localized rectification of every pixel using each lidar point, thereby joining the lidar to the imagery not by horizontal position—as done in traditional colorization—but by the vector (or ray) of collection. This results in a colorized lidar dataset with minimized occlusion where there are overlapping images by effectively filling the hole created by building lean with an adjacent frame with a different look angle at the scene. This results in a final product that approximates a True Orthophoto. Additionally, ray tracing colorization is able to more accurately color the sides of objects where multiple look angles exist from the raw image frames.

Embodiments of the present disclosure employ a raytracing approach to spectral assignment of lidar point clouds from imagery, which results in improvements in accuracies of colorization and analytic capabilities of the combined datasets. Multiple image captures (e.g., look angles) of a scene captured by image sensors and corresponding image sensor acquisition parameters can be utilized to identify a color (e.g., in Red-Green-Blue (RGB) or Red-Green-Blue-Infrared (RGBI) space) for each point of a lidar data set. This approach can take advantage of image overlap and look angles to more accurately integrate imagery spectra with lidar data. Colors can be assigned directly from unrectified imagery by associating each lidar pulse with a most appropriate image and pixel based on pulse origin and image capture location. As a result, discrepancies such as feature lean and occlusion may be reduced or eliminated when compared to traditional rectification and colorization methods.

In a method of generating the enhanced lidar data of the present disclosure, lidar data of a scene and images of the scene are obtained. The lidar data is obtained with a lidar sensor, wherein the lidar data includes a plurality of lidar points. For each of the plurality of lidar points a position of the lidar sensor when the lidar point was collected is also obtained. Additionally, a plurality of images of the scene are obtained with an image sensor. For each of the images a position of the image sensor when the image was captured is obtained.

For each of the plurality of lidar points a best image from the plurality of images containing the best spectral data is determined. The best image is determined by comparing the position of the lidar sensor for a lidar point when the lidar points was obtained to the position of the image sensor for each of the images when the plurality of images were obtained.

Utilizing the best image, for each of the plurality of lidar points a corresponding pixel in the best image is determined. A color is assigned to each of the plurality of lidar points based on the color of the corresponding pixel in the corresponding best image. From a compilation of the assigned colors for each of the plurality lidar points enhanced lidar data can be generated.

The determination of the best image by comparing the position of the lidar sensor for a lidar point when the lidar point was obtained to the position of the image sensor for each of the images when the plurality of images were obtained can be formed by a number of methods.

In a first method, a look angle of the lidar sensor to the lidar points is compared to a look angle of the image sensor for each of the plurality of images to the lidar point. The best image is the image having a similar image sensor look angle to the lidar sensor look angle of the lidar point.

In another method, a position of the lidar sensor for the lidar point is compared to a position of the image sensor for each of images. The best image is the image having an image sensor position most similar to the lidar sensor position for the lidar points.

In still another method, the distance between each image frame's center and the lidar point is calculated. The best image is the image with the smallest calculated distance. In this way, the pixel closest to the center of its frame is used for colorization to most closely approximate True Orthophotography. Other and further objects of the invention, together with the features of novelty appurtenant thereto, will appear in the course of the following description.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The description of the preferred embodiments is intended to be read in connection with the accompanying figures, which are to be considered part of the entire written description of these disclosures. While the present disclosure is susceptible to various modifications and alternative forms, specific embodiments are shown by way of example in the drawings and will be described in detail herein. It should be understood, however, that the present disclosure is not intended to be limited to the particular forms disclosed. Rather, the present disclosure covers all modifications, equivalents, and alternatives that fall within the spirit and scope of these exemplary embodiments.

Figure 1:
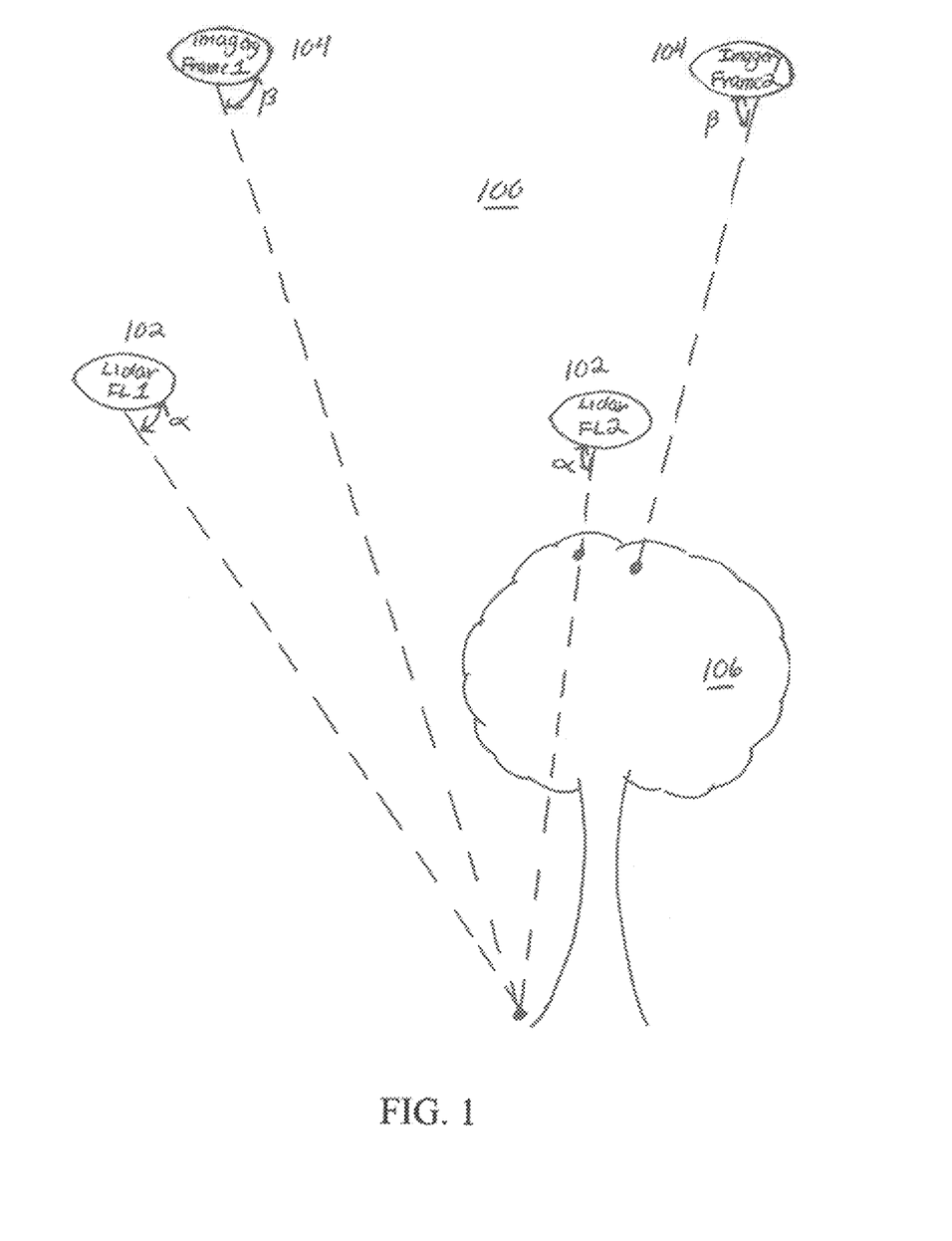
FIG. 1 illustrates data capture of a single scene with imagery and lidar sensors.
Figure 2:
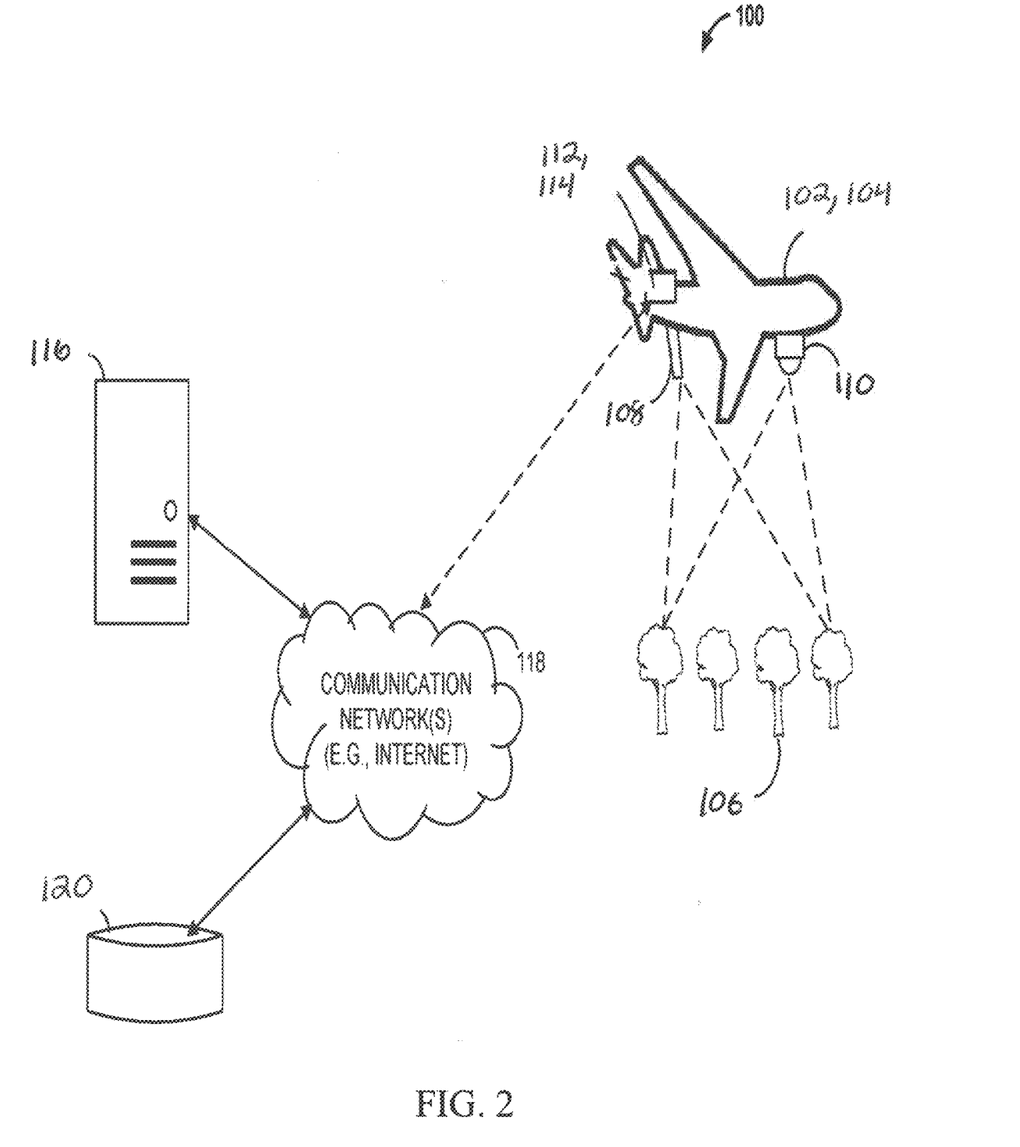
FIG. 2 illustrates a geospatial data capturing system of the present disclosure.

Referring now to the figures in which like reference designators refer to like elements, there is shown in, FIGS. 1 and 2 diagrams of a geospatial data capture system 100. The geospatial data capture system 100 can include multiple aircraft 102, 104 flying over a scene (e.g., trees) 106. The aircraft 102, 104 may be configured to collect data using either lidar 108 and/or imagery 110. Each type of data can be collected according to differing flight plans, including but not limited to, different orientation of flight lines, different altitudes, and different spatial locations of the sensors at the time of capture. The captures need not occur on the same day or at the same time, though best results will occur when collection times are similar enough to minimize changes to scene between captures. This ability to compensate for differences in the spatial locations and look angles of the individual data collections provides robust colorization anywhere both imagery and lidar have been collected.

In an embodiment, the aircraft 102 collecting lidar data includes a laser scanning system (e.g., laser and corresponding lidar sensor) 108 and computing device 112. The laser scanning system 108 is operable to transmit a laser beam (e.g., laser pulses) to scene 106 and detect reflections with the lidar sensor 108 to generate lidar data associated with three-dimensional (3D) measurements (e.g., x, y, z positional measurements).

The aircraft 104 collecting imagery includes an imagery sensory (e.g., camera) 110 and computing device 114. Imagery sensor 110 is operable to capture images of the scene 106. Imagery sensor 110 may be a high resolution camera such as a charge-coupled device (CCD) frame-based camera, a push broom style, hyperspectral, or any suitable camera.

Although the above example illustrates aircraft, any other suitable collection vehicle may be utilized, including, helicopters, cars, drones, one or more tripods, and the like.

In an embodiment, a lidar equipped aircraft 102 surveys the scene 106, which can include trees, buildings, and the like, by flying over portions of scene 106 according to a flight plan. The flight plan permits the capture of lidar data from varying look angles α, (as measured from the lidar sensor 108)

Similarly, an image capturing aircraft 104 surveys the scene 106 by flying over portions the of scene 106 according to a flight plan. The flight plan permits the capture of images of scene from varying look angles β, as measured from the imagery sensor 110. The imagery and lidar collection flight plans need not be the same, and can each optionally occur at different times.

The collected lidar data and imagery are each transferred to a processing system 116, for example through a communication network 118, and can be stored on a storage device 120. The processing device 116 analyzes the lidar data and imagery, assigning a color to each lidar point from an image with a particular viewing perspective (i.e., best image) of the lidar point.

In an embodiment, the image with the particular viewing perspective is the image where the position of aircraft 104 at the moment of image capture for the image was the closest to the position of aircraft 102 at the moment of lidar capture. The processing system 116 calculates an X-Y distance between the position of the lidar sensor 108 on the aircraft 102 and the imagery sensor 110 on aircraft 104 for each captured image (e.g., that includes the corresponding lidar point). The processing system 116 then selects the image for which this distance is smallest.

Figure 3:
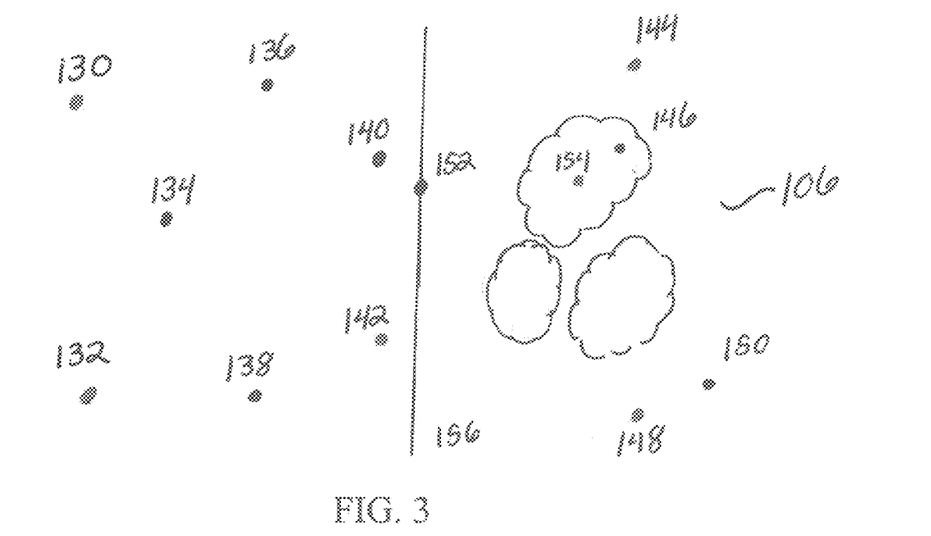
FIG. 3 illustrates an overhead example of data capture for uses in an embodiment.

Referring to FIG. 3, multiple image sensor 110 positions 130-150 on the aircraft 104 during image capture of the scene 106 are shown. Additionally, the spatial position 152 of the lidar sensor 108 on aircraft 102 at the moment of lidar capture along the flight path 156 is shown. The processing system 116 determines the X/Y position for each of the image sensors positions 130-150 and compares them to the spatial position 152. As the determined X/Y position of image sensor 140 is closest to the X/Y position of the lidar sensor 108, the processing system 116 selects the corresponding image as the best image.

In another embodiment, the image with the particular viewing perspective is the image whose computed collection vector is most similar (e.g., closest) to a computed collection vector for the lidar capture. The processing system 116 calculates a lidar vector (e.g., 3D lidar vector) used to collect the lidar point, where the heading of the lidar vector is $\arctan((y_{point}-y_{sensor})/(x_{point}-x_{sensor}))$. The processing system 116 calculates as an image vector (e.g., 3D image vector) used to collect the pixel in question for each possible image, where the heading of the image vector is $\arctan((y_{point}-y_{frame\_center})/(x_{point}-x_{frame\_center}))$. The processing system 116 then calculates the difference between the lidar vector's heading and the heading of each image vector and selects the image corresponding to the smallest difference in headings as the best image.

Figure 4:
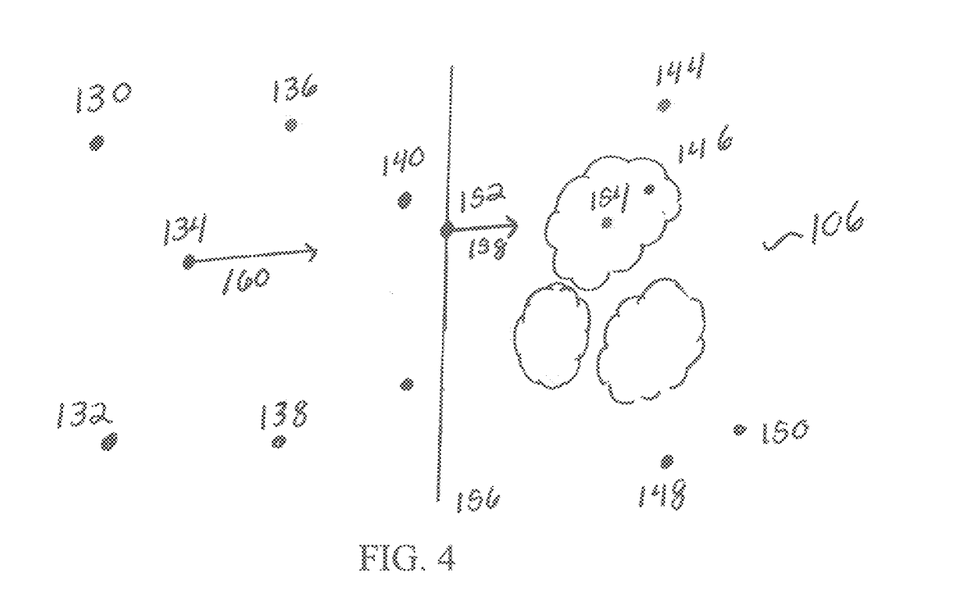
FIG. 4 illustrates an overhead example of data capture for uses in another embodiment.

Referring to FIG. 4, the processing system 116 calculates a lidar vector 158 (e.g., 3D lidar vector) for lidar position 152 of the lidar sensor 108 on aircraft 102 at the moment of lidar capture along the flight path 156 used to collect the lidar point 154, where the heading of the lidar vector is $\arctan((y_{point}-y_{sensor})/(x_{point}-x_{sensor}))$. The processing system 116 calculates an image vector 160 (e.g., 3D image vector) for the multiple image sensor positions 130-150 on the aircraft 104 during image capture of the scene 106 used to collect the pixel in question for each possible image to the lidar point 154, where the heading of the image vector 160 is arctan$((y_{point}-y_{frame\_center})/(x_{point}-x_{frame\_center}))$. The processing system 116 then calculates the difference between the lidar vector's 158 heading and the heading of each image vector 160 and selects the image corresponding to the smallest difference in headings. The heading of image vector 160 for image position 134 and the heading of lidar vector 158 between lidar position 152 and lidar point 154 are most similar, so it is selected as the best image.

In a further embodiment, the image with the particular viewing perspective is the image that captured the lidar point closest to its center, namely, a closest position measured from the imagery sensor 108 to the captured lidar point 154. The processing system 116 determines the pixel needed in each source image (e.g., the pixel(s) corresponding to the lidar point 154). The processing system 116 then determines the distance from this pixel to the center of the imagery sensor 108 and selects the image for which this distance is smallest (e.g., closest to the center of the image).

Figure 5:
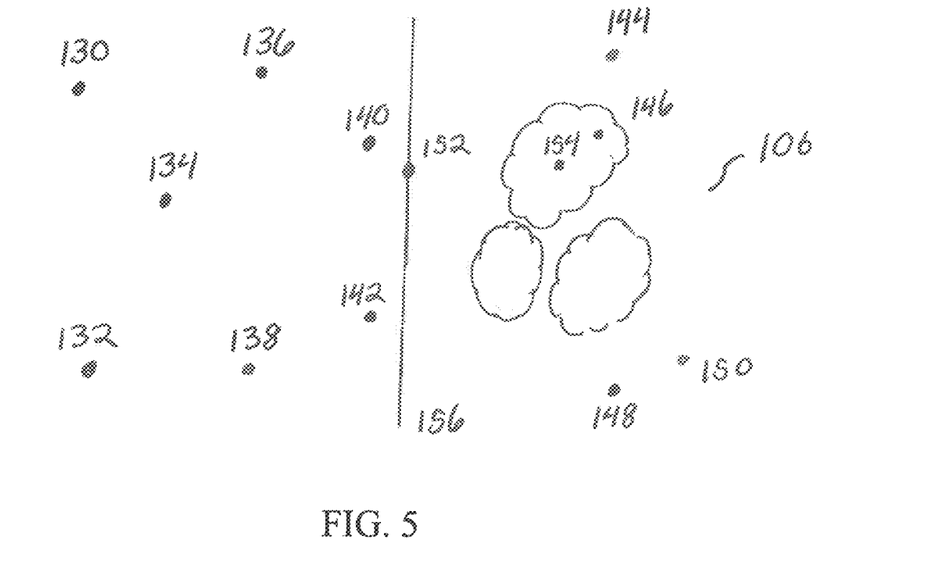
FIG. 5 illustrates an overhead example of data capture for uses in a further embodiment.

Referring to FIG. 5, the processing system 116 determines the lidar point position 154 and compares it to the multiple image sensor positions 130-150. The processing system 116 then determines the distance from this pixel to the center of the imagery sensor 108 for each of the image sensor positions 130-150 and selects the image for which this distance is smallest (e.g., closest to the center of the image). As the distance from lidar point position 154 to the center of the imagery sensor 108 for image sensor position 146 is the smallest, the processing system 116 selects the corresponding image as the best image.

Figure 6:
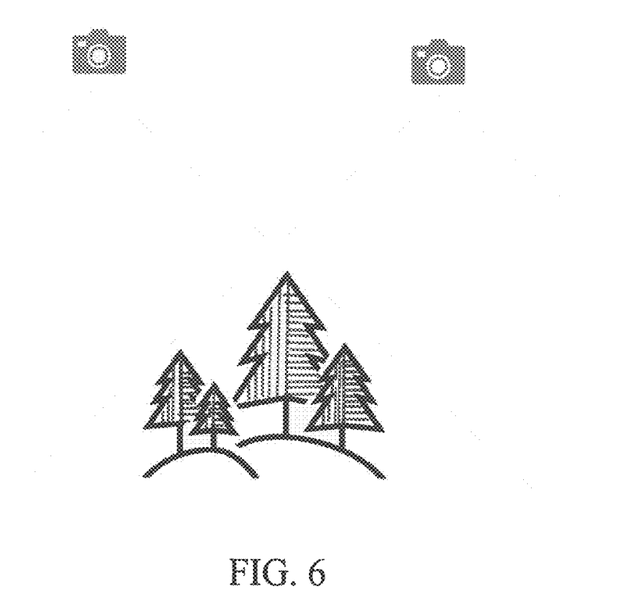
FIG. 6 illustrates ray tracing colorization using multiple imagery look angles.

Referring to FIG. 6 illustrates ray tracing colorization using multiple imagery look angles. By selecting the appropriate image based on the angle of collection for each point, all lidar points will contain accurate spectral information. Conversely, using a single image to colorize all lidar points can result in points with missing or incorrect spectral information since the imagery frame used would have had an obstructed view of the points on one side of the tree.

Utilizing one of the embodiments for determining the particular viewing perspective, the processing system 116 determines which image should be selected and then assigns a color for the lidar point. In an embodiment, the processing system 116 initialize a 3×3 transformation matrix using the following imagery sensor parameters (which may be stored in database):

i) 3D position of image sensor at the moment of capture in X, Y, Z;
ii) Rotation of image sensor with respect to working coordinate system in directions Omega, Phi, Kappa;
iii) width in pixels;
iv) height in pixels;
v) focal length of camera;
vi) physical size of CCD used to capture spectral information from scene; and
vii) the principal point offset, commonly described as "that point on the image plane which is at the base of the perpendicular from the 'center of the lens'".

The processing system 116 computes an inverse of the transformation matrix defined above. It then initializes a 3×1 matrix with the X, Y, and Z positions of the lidar point and performs matrix multiplication with these two matrices. The resulting 3×1 matrix is scaled by multiplying each element by a constant such that the third element becomes equal to the focal length of imagery sensor 110. The first two elements of the resulting 3×1 matrix now contain the physical x/y offsets from the center of the CCD to the pixel containing spectral information for the lidar point in question. These physical offsets are divided by the resolution of the CCD to determine which pixel in the processed raw image is needed.

The position data can be converted to an integer pixel location indicating which pixel from an image contains the color for the lidar point (e.g., for the 3D lidar point). The color from the pixel identified by the position data is used to populate color (e.g., RGB or RGBI) attributes of the lidar point (e.g., in a LAS file). For example, the processing system 116 can generate enhanced lidar data identifying the lidar points and determined color attributes.

The use of this method may enable the elimination of the need for seamlines to create a traditional orthophoto product, and a minimization of the occlusion of final colorized lidar product. Moreover, the use of this method may directly co-register image spectra with lidar data to support classification and analysis. In an example, machine learning models (e.g., as executed by secondary computing device) operating on the generated enhanced lidar data may more easily identify trees in scene compared to operating on the original lidar data. The machine learning models may classify the trees in scene as trees with higher probabilities, and allow for generation of True Orthophotography with no tree or building lean that is typical with standard imagery rectification.

The described method may be optimized to achieve optimal processing speed by the implementation of one or more of a variety of methods. In an example, all calculation performed (e.g., such as to initialize each 3×3 transformation matrix) can be pre-cached for each image so it only needs to be done once for each image.

Additional programmatic steps may be taken to reduce necessary operations for the calculation of a given point to the absolute minimum to reduce CPU load, including, but not limited to:

i) The structure of input images are analyzed prior to processing.
ii) Two separate passes may be made of LAS files, the first of which allows for the ordering of queries to the image, taking advantage of the physical structure. If, for example, an input image uses a 128×128 tiling scheme, the lidar points are grouped by which tile they need so that the image only needs to be accessed once and then those values are used to populate all possible LAS points. This process may reduce I/O load without requiring the LAS points to be sorted before execution.
iii) The process may also adapt to any image format, optimizing performance for each. In an example, temporary files are utilized for analyzing the images to allow scaling to any file size. The temporary files can be stored in a solid state drive (SSD) memory device for faster access times.

Figure 7:
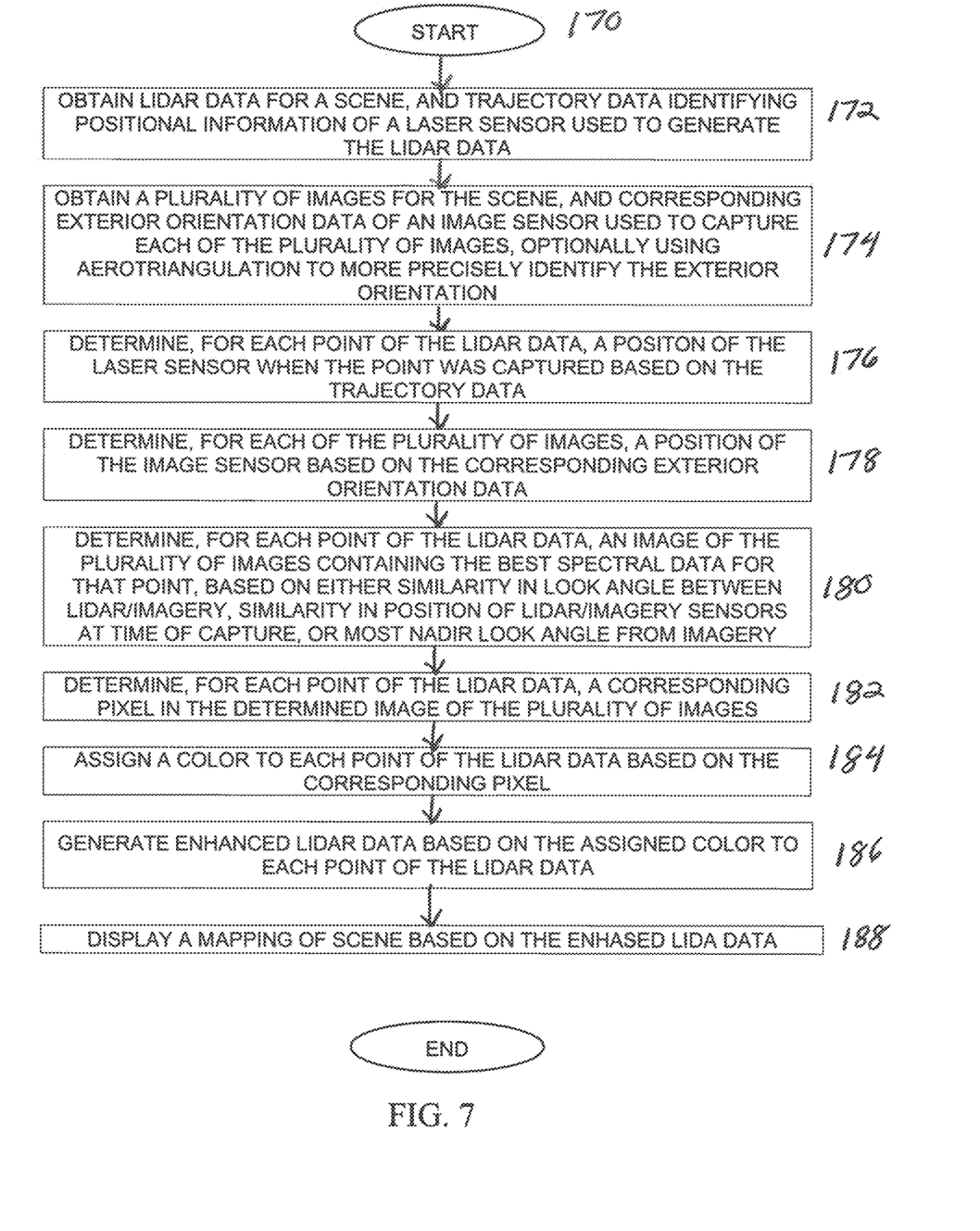
FIG. 7 illustrates a flowchart of an exemplary method in accordance with some embodiments.

Referring to FIG. 7, an exemplary method 170 is provided. The method 170 may be carried out by the computing devices 112 or 114 or the processing system 116. Initially, lidar data for a scene is obtained 172. The trajectory data identifying positional information of a laser sensor used to generate the lidar data is determined. The plurality of images for the scene are obtained 174. In addition, corresponding exterior orientation data of an image sensor used to capture each of the plurality of images is determined.

For each point of the lidar data, a position of the laser sensor when the point was captured based on the trajectory data is demined 176. At step 178, the computing device determines, for each of the plurality of images, a position of the image sensor based on the corresponding exterior orientation data. At step 180 the computing device determines, for each point of the lidar data, an image of the plurality of images based on the position of the laser sensor when the point was captured and the positions of the image sensor for each of the plurality of images.

Further, at step 182, the computing device determines, for each point of the lidar data, a corresponding pixel in the determined image of the plurality of images. At step 184, the computing device assigns a color to each point of the lidar data based on the corresponding pixel.

Proceeding to step 186, the computing device generates enhanced lidar data based on the assigned color to each point of the lidar data. At step 188, the computing device optionally displays a mapping of the scene based on the enhanced lidar data.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A method of generating enhanced lidar data of a scene, comprising:
    obtaining lidar data of the scene with a lidar sensor, wherein the lidar data includes a plurality of lidar points;
    obtaining a plurality of images of the scene with an image sensor;
    determining for each of the plurality of lidar points a position of the lidar sensor when the lidar point was obtained;
    determining for each of the plurality of images a position of the image sensor when the image was obtained;
    for each of the plurality of lidar points, comparing the position of the lidar sensor for the lidar point to the position of the image sensor for each of the images;
    determining for each of the plurality of lidar points, based on the corresponding comparisons, a best image from the plurality of images, the best image containing a best spectral data;
    determining for each of the plurality of lidar points a corresponding pixel in the corresponding best image of the plurality of images;
    assigning a color to each of the plurality of lidar points based on the corresponding pixel in the best image; and
    generating the enhanced lidar data of the scene based on the assigned colors for each of the plurality lidar points.

2. The method of generating enhanced lidar data as set forth in claim 1, further comprising:
    obtaining trajectory data of the lidar senor while obtaining the lidar data; and
    determining from the trajectory data a position of the at least lidar sensor for each of the plurality of lidar points when each of the lidar points were obtained.

3. The method of generating enhanced lidar data as set forth in claim 2, further comprising:
    obtaining orientation data of the image senor while obtaining the plurality of images; and
    determining from the orientation data a position of the at least image sensor for each of the plurality of images when each of the plurality of images were obtained.

4. The method of generating enhanced lidar data as set forth in claim 1, wherein comparing the position of the lidar sensor for the lidar point to the position of the image sensor for each of the plurality of images comprises:
    comparing a look angle of the lidar sensor to the lidar point to a look angle of the image senor for each of the plurality of images to the lidar point; and
    selecting the best image, where the best image is an image having a similar image sensor look angle to the lidar sensor look angle of the lidar point.

5. The method of generating enhanced lidar data as set forth in claim 1, wherein comparing the position of the lidar sensor for the lidar point to the position of the image sensor for each of the plurality of images comprises:
    comparing a position of the lidar sensor for the lidar point to a position of the image senor for each of images; and
    selecting the best image, where the best image is an image having a similar image sensor position to the lidar sensor position for the lidar points.

6. The method of generating enhanced lidar data as set forth in claim 1, wherein comparing the position of the lidar sensor for the lidar point to the position of the image sensor for each of the plurality of images comprises:
    comparing a vector of the lidar sensor to the lidar point to a vector of the image senor to the lidar point; and
    selecting the best images, where the best image is an image having a similar image sensor vector to the lidar sensor vector the lidar point.

7. The method of generating enhanced lidar data as set forth in claim 1, further comprising displaying a mapping of the enhanced lidar data.

8. A method of generating enhanced lidar data of a scene, comprising:
    obtaining lidar data of a scene with at least one lidar sensor, wherein the lidar data includes a plurality of lidar points;
    obtaining trajectory data of the at least one lidar senor while obtaining the lidar data;
    determining from the trajectory data a position of the at least lidar sensor for each of the plurality of lidar points when each of the lidar points were obtained;
    obtaining a plurality of images of the scene with at least one image sensor;
    obtaining orientation data of the at least image sensor while obtaining the plurality of images;
    determining from the orientation data a position of the at least image sensor for each of the plurality of images when each of the plurality of images were obtained;
    for each of the plurality of lidar points, comparing the position of the at least one lidar sensor for the lidar point to the position of the at least image sensor for each of the images;
    determining for each of the plurality of lidar points, based on the corresponding comparisons, a best image from the plurality of images, the best image containing a best spectral data;
    determining for each of the plurality of lidar points a corresponding pixel in the corresponding best image of the plurality of images;
    assigning a color to each of the plurality of lidar point based on the corresponding pixel in the best image; and
    generating the enhanced lidar data of the scene based on the assigned colors for each of the plurality lidar points.

9. The method of generating enhanced lidar data as set forth in claim 8, wherein comparing the position of the at least one lidar sensor for the lidar point to the position of the at least image sensor for each of the plurality of images comprises:

comparing a look angle of the at least one lidar sensor to the lidar point to a look angle of the at least one image senor for each of the plurality of images to the lidar point; and selecting the best image, where the best image is an image having a similar image sensor look angle to the lidar sensor look angle of the lidar point.

10. The method of generating enhanced lidar data as set forth in claim 8, wherein comparing the position of the at least one lidar sensor for the lidar point to the position of the at least image sensor for each of the plurality of images comprises:

comparing a position of the at least one lidar sensor for the lidar point to a position of the at least one image senor for each of images; and selecting the best image, where the best image is an image having a similar image sensor position to the lidar sensor position for the lidar points.

11. The method of generating enhanced lidar data as set forth in claim 8, wherein comparing the position of the at least one lidar sensor for each of the lidar points to the position of the at least one image sensor for each of the plurality of images comprises:

comparing a vector of the at least one lidar sensor to the lidar point to a vector of the at least image senor to the lidar point;

selecting the best images, where the best image is an image having a similar image sensor vector to the lidar sensor vector the lidar point.

12. The method of generating enhanced lidar data as set forth in claim 8, further comprising displaying a mapping of the enhanced lidar data.

13. A system for generating enhanced lidar data of a scene, comprising:

a lidar point collection system including a lidar senor and a lidar point processing system, wherein the lidar point collection system can obtain lidar data of the scene with the lidar sensor, the lidar data includes a plurality of lidar points;

an image collection system including an image sensor and an image processing system, wherein the image collection system can obtain a plurality of images of the scene with the image sensor; and a processing system configured to performing the steps of:
determining for each of the plurality of lidar points a position of the lidar sensor when the lidar point was obtained, determining for each of the plurality of images a position of the image sensor when the image was obtained, for each of the plurality of lidar points comparing the position of the lidar sensor for the lidar point to the position of the image sensor for each of the images, determining for each of the plurality of lidar points, based on the corresponding comparisons, a best image from the plurality of images, the best image containing a best spectral data;

determining for each of the plurality of lidar points a corresponding pixel in the corresponding best image of the plurality of images, assigning a color to each of the plurality of lidar point based on the corresponding pixel in the best image; and generating the enhanced lidar data based on the assigned colors for each of the plurality lidar points.

14. The system for generating enhanced lidar data of a scene as set forth in claim 13, wherein the lidar processing system is mounted on a vehicle.

15. The system for generating enhanced lidar data of a scene as set for the in claim 13, wherein the image processing system is mounted on a vehicle.

16. The system for generating enhanced lidar data of a scene as set forth in claim 13, wherein comparing the position of the lidar sensor for the lidar point to the position of the image sensor for each of the plurality of images comprises:

comparing a look angle of the lidar sensor to the lidar point to a look angle of the image senor for each of the plurality of images to the lidar point; and selecting the best image, where the best image is an image having a similar image sensor look angle to the lidar sensor look angle of the lidar point.

17. The system for generating enhanced lidar data of a scene as set forth in claim 13, wherein comparing the position of the lidar sensor for the lidar point to the position of the image sensor for each of the plurality of images comprises:

comparing a position of the lidar sensor for the lidar point to a position of the image senor for each of images; and selecting the best image, where the best image is an image having a similar image sensor position to the lidar sensor position for the lidar points.

18. The system for generating enhanced lidar data of a scene as set forth in claim 13, wherein comparing the position of the lidar sensor for the lidar point when the lidar point was obtained to the position of the image sensor for each of the images when the plurality of images were obtained comprises:

comparing a vector of the lidar sensor to the lidar point to a vector of the image senor to the lidar point;

selecting the best images, where the best image is an image having a similar image sensor vector to the lidar sensor vector the lidar point.

19. The system for generating enhanced lidar data of a scene as set forth in claim 13, wherein the processing system is configured to perform the steps of:

obtaining trajectory data of the lidar senor while obtaining the lidar data;

determining from the trajectory data a position of the at least lidar sensor for each of the plurality of lidar points when each of the lidar points were obtained;

obtaining orientation data of the image senor while obtaining the plurality of images; and determining from the orientation data a position of the at least image sensor for each of the plurality of images when each of the plurality of images were obtained.

20. The system for generating enhanced lidar data of a scene as set forth in claim 13, wherein the processing system is configured to perform the steps of displaying a mapping of the enhanced lidar data.

* * * * *